US012557783B2

(12) United States Patent
Tedeschi

(10) Patent No.: US 12,557,783 B2
(45) Date of Patent: Feb. 24, 2026

(54) ANIMAL FEEDING APPARATUS

(71) Applicant: Mike Alfonso Tedeschi, Sharpsburg, MD (US)

(72) Inventor: Mike Alfonso Tedeschi, Sharpsburg, MD (US)

( * ) Notice: Subject to any disclaimer, the term of this patent is extended or adjusted under 35 U.S.C. 154(b) by 0 days.

(21) Appl. No.: 18/929,260

(22) Filed: Oct. 28, 2024

(65) Prior Publication Data

US 2025/0134062 A1     May 1, 2025

Related U.S. Application Data

(60) Provisional application No. 63/593,444, filed on Oct. 26, 2023.

(51) Int. Cl.
*A01K 5/02* (2006.01)

(52) U.S. Cl.
CPC .................................. *A01K 5/0291* (2013.01)

(58) Field of Classification Search
CPC ............................ A01K 5/0291; A01K 5/0287
See application file for complete search history.

(56) References Cited

U.S. PATENT DOCUMENTS

| 3,955,537 A | * | 5/1976 | Yujiri | ................... A01K 5/0275 |
| | | | | 119/51.13 |
| 4,000,719 A | * | 1/1977 | Richards | .............. A01K 5/0291 |
| | | | | 119/51.13 |

| 4,617,874 A | * | 10/1986 | Zammarano | ......... A01K 5/0291 |
| | | | | 119/51.12 |
| 7,021,240 B1 | | 4/2006 | Tippetts | |
| 7,162,974 B2 | | 1/2007 | Tippetts | |
| 9,560,834 B2 | | 2/2017 | Ma | |
| 10,912,279 B2 | | 2/2021 | Chen et al. | |
| 11,076,578 B2 | * | 8/2021 | Luttrell | ................ A01K 5/0291 |
| 12,058,982 B2 | * | 8/2024 | Qiu | ...................... A01K 5/0114 |
| 2008/0289580 A1 | * | 11/2008 | Krishnamurthy | .... A01K 5/0291 |
| | | | | 119/51.11 |
| 2011/0197819 A1 | * | 8/2011 | Montgomery | ....... A01K 5/0291 |
| | | | | 119/51.11 |
| 2017/0035025 A1 | * | 2/2017 | Oates | ................... A01K 5/0275 |

OTHER PUBLICATIONS

Automatic Pet Feeder With Simple Encoder, retrieved from the internet, retreived on Feb. 8, 2024; <URL:https://www.printables. com/model/21870-automatic-pet-feeder-with-simple-encoder>.

* cited by examiner

*Primary Examiner* — Ebony E Evans

(57) ABSTRACT

An animal feeding apparatus includes a base, a tray, and a housing. The tray comprises a rotary plate. The base comprises a motor having a motor shaft operably coupled with the rotary plate to rotate the tray. The base further comprises a power source supplying power to the motor and a controller configured to operate the motor. The tray further comprises a plurality of radial chambers. The plurality of radial chambers is configured to hold animal food items for consumption. The housing is attached to the base. The housing comprises an opening allowing one of the plurality of radial chambers to be accessible to an animal.

12 Claims, 13 Drawing Sheets

114

110

116

117

ANIMAL FEEDING APPARATUS

FIELD OF THE INVENTION

The present invention relates generally to animal feeding apparatuses. More specifically, the present invention is an animal feeding apparatus that rotates to display food to an animal. However, the present invention is not limited to this option, and it may further be adapted for different purposes.

BACKGROUND OF THE INVENTION

An automatic animal feeder is usually equipped with features such as programmable timing, multiple compartments for different meals, protection from weather and pests, and battery or electric operation. It prevents overeating and overcrowding, making it suitable for various animals, including livestock and pets. By automating feeding schedules, these feeders reduce the labor involved in daily feeding routines and help maintain the health and productivity of animals.

However, there are some drawbacks associated with the existing animal feeder. For example, the structural design is not good. The animal may acquire extra food through some actions and damage the feeder. Moreover, programming is complicated, and manipulation is difficult.

Therefore, it is an objective of the present invention to provide an animal feeding apparatus that overcomes the problems set forth above.

SUMMARY OF THE INVENTION

The present invention discloses an animal feeding apparatus. The apparatus comprises a base, a tray, and a housing. The tray comprises a rotary plate. The base comprises a motor having a motor shaft operably coupled with the rotary plate to rotate the tray. The base further comprises a power source supplying power to the motor and a controller configured to operate the motor. The tray further comprises a plurality of radial chambers. The plurality of radial chambers is configured to hold animal food items for consumption. The housing is attached to the base. The housing comprises an opening allowing one of the plurality of radial chambers to be accessible to an animal.

In one embodiment, the rotary plate comprises a motor shaft hole that has a complementary shape to the motor shaft to receive the motor shaft.

In one embodiment, the plurality of radial chambers is formed by a plurality of partitions extending vertically from the rotary plate.

In one embodiment, the tray further comprises a central tube, and the plurality of partitions extends radially from the central tube.

In one embodiment, the plurality of radial chambers each comprises an animal food securing mechanism.

In one embodiment, the animal food securing mechanism comprises a vertical shaft with a pointed head.

In one embodiment, the base further comprises a plurality of draining holes.

In one embodiment, the plurality of radial chambers each comprises a locking hole, and the base further comprises an actuator configured to operate a locking pin to insert into or retract from the locking hole.

In one embodiment, the power source is configured to supply power to the actuator, and the controller is further configured to control the actuator to retract the locking pin from the locking hole when the rotary plate is being rotated by the motor, and insert the locking pin into the locking hole when the rotary plate is not being rotated by the motor.

In one embodiment, the controller is further configured to communicate with a user device to receive commands to operate the motor.

In one embodiment, the base further comprises a base housing to accommodate the motor, the actuator, the controller, and the power source.

In one embodiment, the present invention further comprises a mounting bracket attached to the base.

In one embodiment, the housing comprises a lid.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
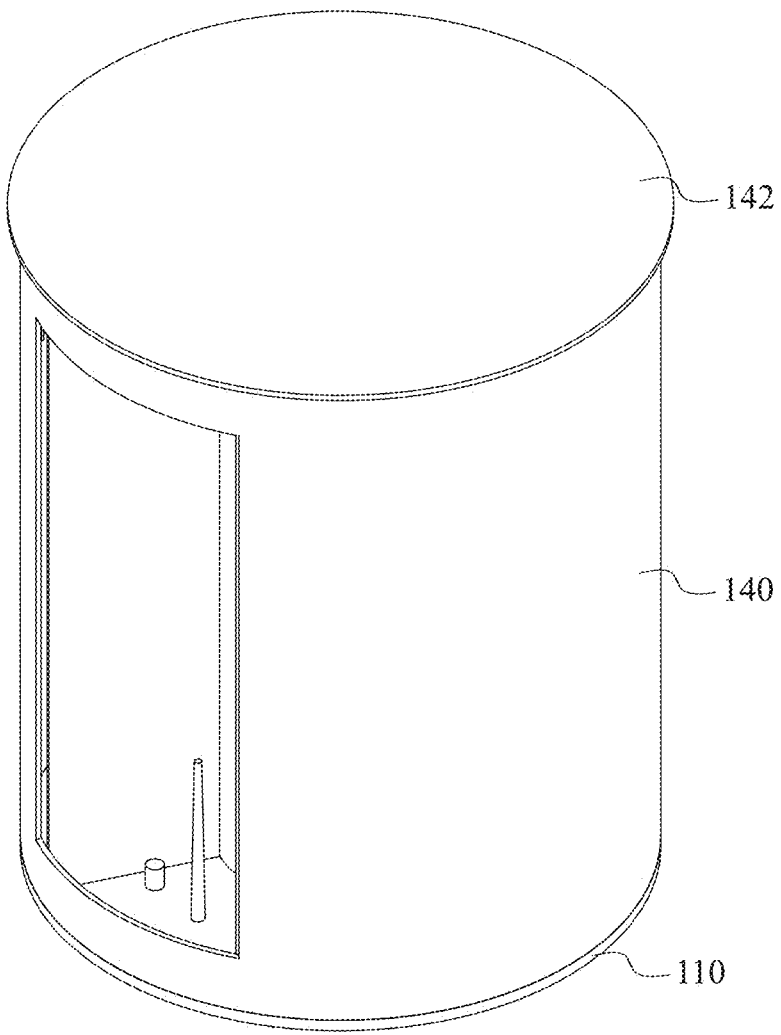
FIG. 1 depicts a perspective view of the present invention.
Figure 2:
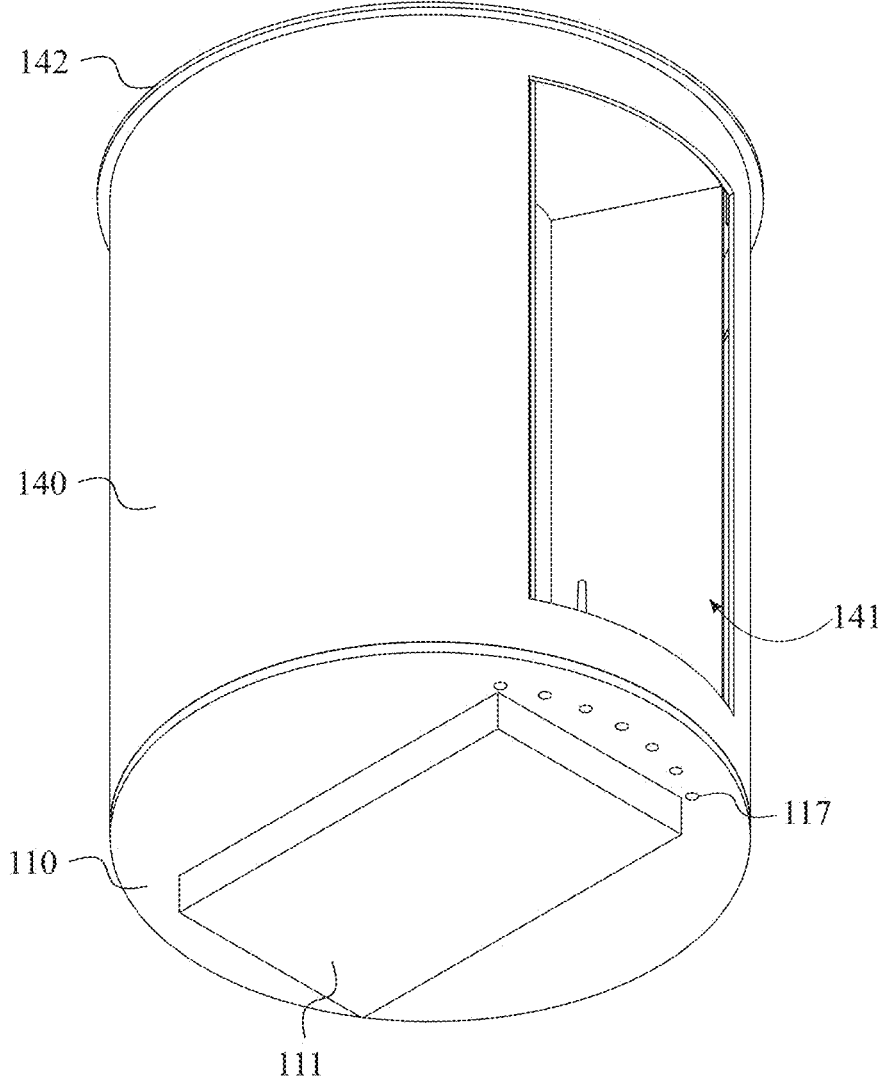
FIG. 2 depicts another perspective view of the present invention.
Figure 3:
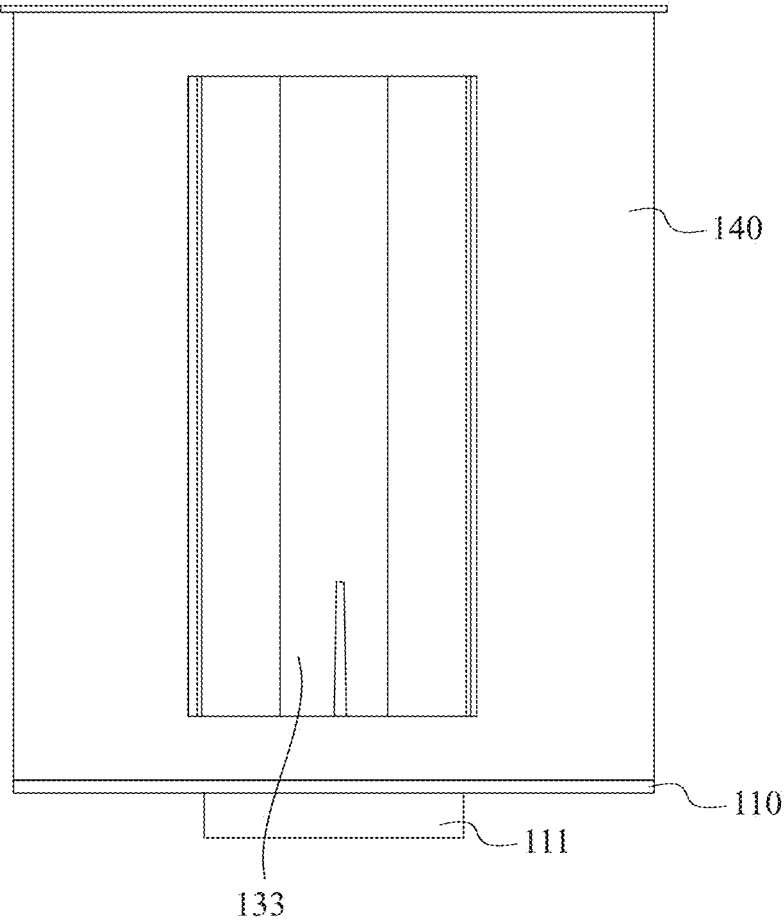
FIG. 3 depicts a front view of the present invention.
Figure 4:
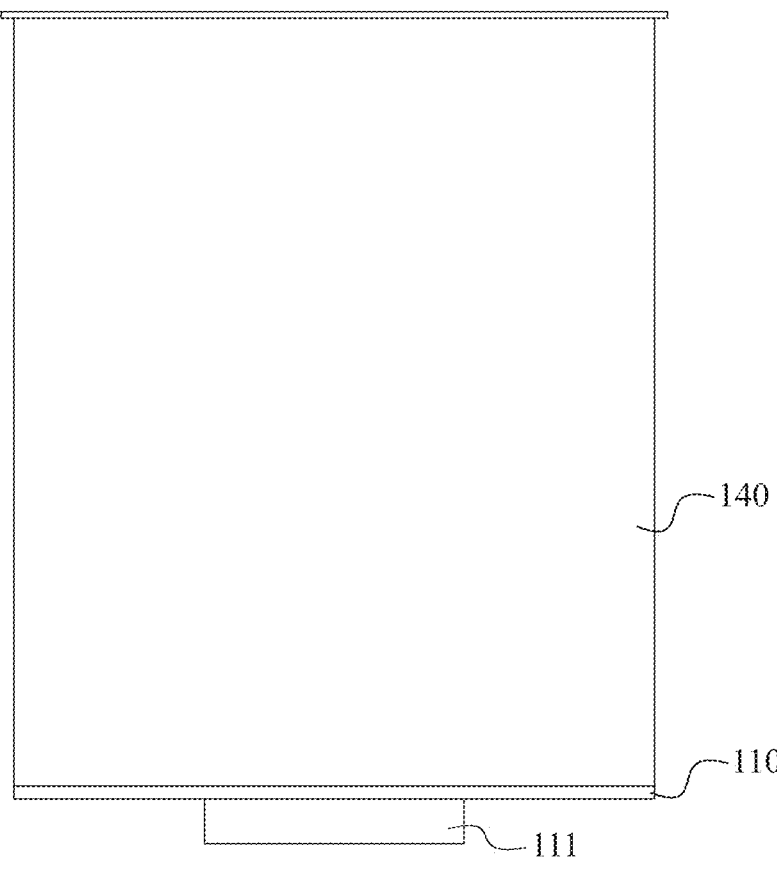
FIG. 4 depicts a rear view of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of animal feeding apparatuses, embodiments of the present disclosure are not limited to use only in this context.

The present invention is a weather resistant rotating feeding apparatus. It is an aim of the present invention to provide users with remotely controlled system to rotate a carrousel tray to expose food to an animal. It is another aim of the present invention to provide an animal feeding apparatus that present food items one at a time.

Referring now to the figures of the present disclosure. The animal feeding apparatus of the present invention comprises a base 110, a tray 130, and a housing 140.

The tray 130 is configured to accommodate animal food items for consumption. It should be noted that the tray 130 can be of any shape, size, material, features, type or kind, orientation, location, quantity, components, and arrangements of components that would allow the present invention to fulfill the objectives and intents of the present invention. In a preferred embodiment, the tray 130 is designed with a circular shape with a slightly smaller diameter than the housing 140 such that the tray 130 can be completely enclosed within the housing 140. In one embodiment, the tray 130 comprises a rotary plate 131 that can be rotated in either direction. Moreover, the tray 130 comprises a plurality of radial chambers 133. The plurality of radial chambers 133 is configured to hold animal food items for consumption. In a preferred embodiment, the plurality of radial chambers 133 is formed by a plurality of partitions 132 extending vertically from the rotary plate 131. The plurality of partitions 132 ensures that an animal searching for food can only access one of the radial chambers 133 at a time until the tray 130 is rotated. In one embodiment, the tray 130 further comprises a central tube 138, and the plurality of partitions 132 extends radially from the central tube 138.

In one embodiment, the plurality of radial chambers 133 each comprises an animal food securing mechanism 135. The animal food securing mechanism 135 is designed to secure the animal food item, such as a cob of corn, in each radial chamber 133. Preferably, the animal food securing mechanism 135 comprises a vertical shaft with a pointed head.

The base 110 provides structural support to the present invention. It should be noted that the base 110 can be of any shape, size, material, features, type or kind, orientation, location, quantity, components, and arrangements of components that would allow the present invention to fulfill the objectives and intents of the present invention. In the illustrated embodiment, the base 110 has a circular shape that corresponds to the tray 130. However, other shapes are also possible and fall into the scope of the present invention. The base 110 comprises a motor 113 having a motor shaft 114. The motor 113 is preferably positioned centrally and configured to rotate the tray 130. The motor shaft 114 is operably coupled with the rotary plate 131 to rotate the tray. Preferably, the rotary plate 131 comprises a motor shaft hole 134 that has a complementary shape to the motor shaft 114 to receive the motor shaft 114. In a preferred embodiment, the motor shaft 114 has a non-circular shape so as to effectively rotate the rotary plate 131. The base 110 further comprises a power source 118 supplying power to the motor 113 and a controller 119 configured to operate the motor 113. In one embodiment, the power source 118 may be a photovoltaic power source, a rechargeable battery, a non-rechargeable battery, battery cells, printed batteries, super capacitors, a control circuit that stores electrical energy, or the like.

Figure 5:
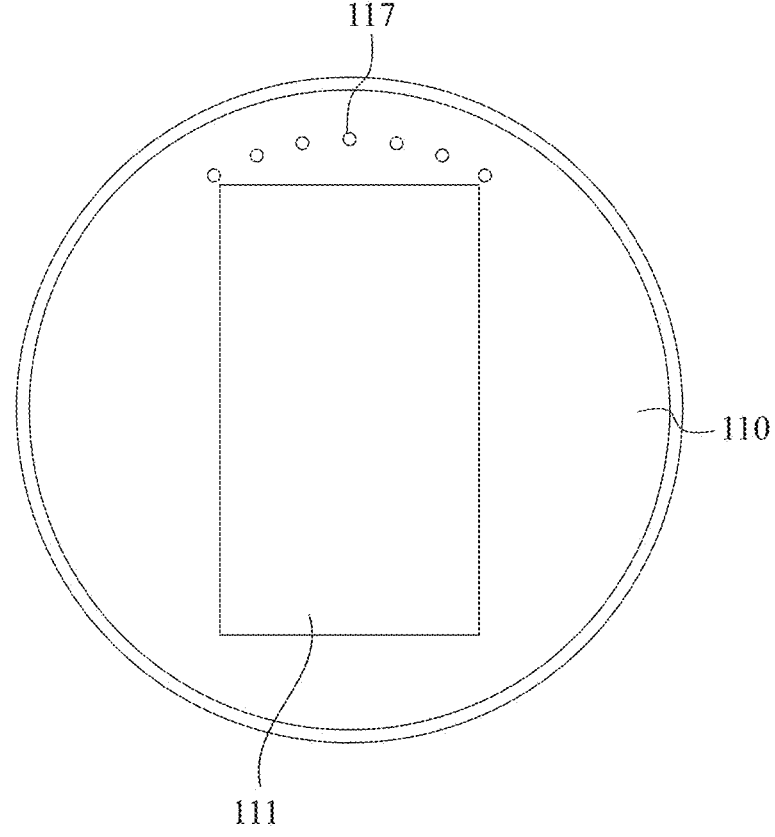
FIG. 5 depicts a bottom view of the present invention.
Figure 6:
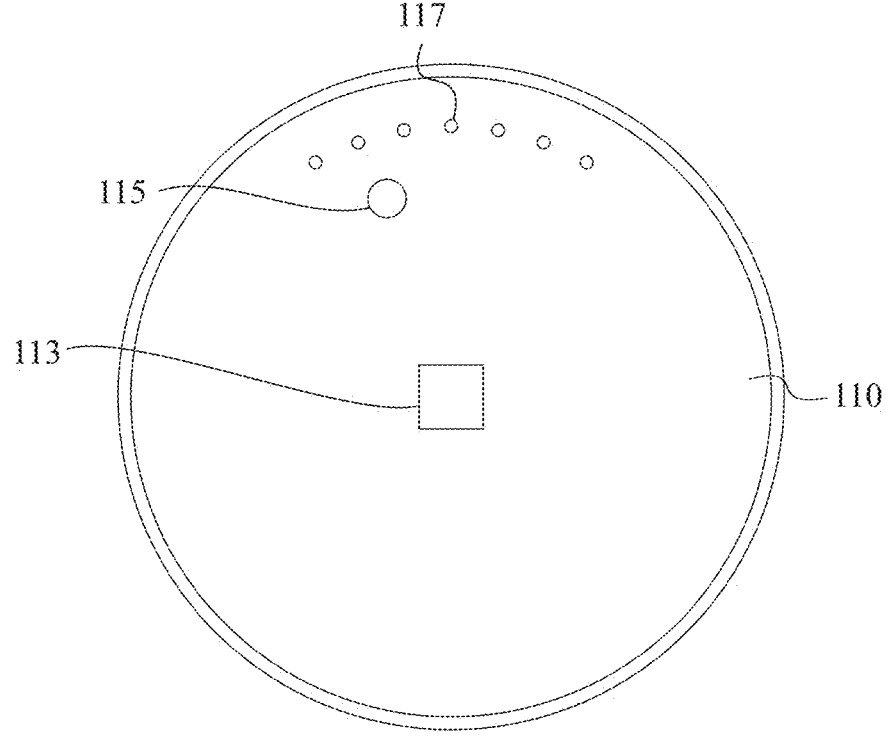
FIG. 6 depicts a bottom view of the present invention, wherein the base housing is removed.
Figure 7:
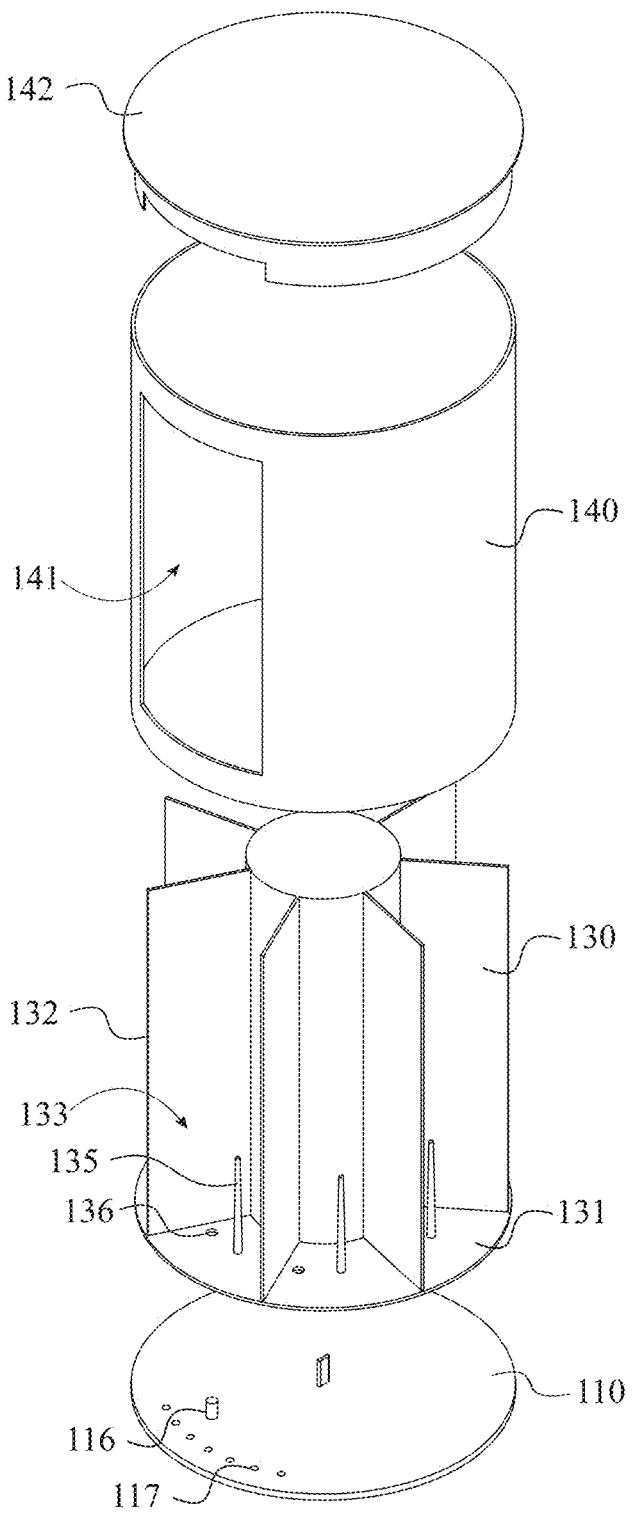
FIG. 7 depicts an exploded view of the present invention.
Figure 9:
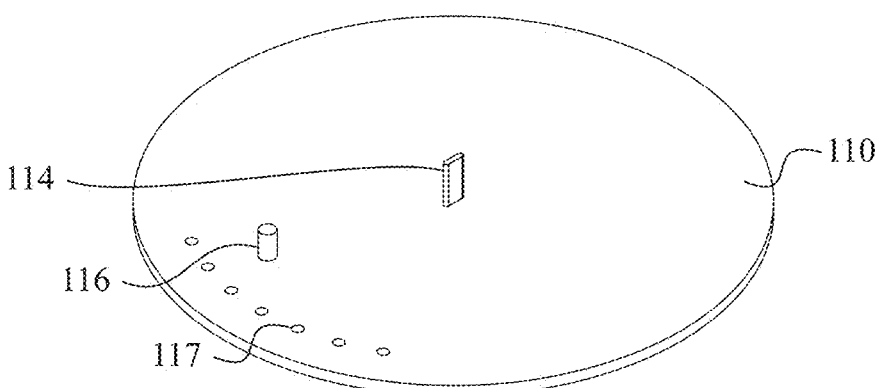
FIG. 9 depicts a perspective view of the base of the present invention.
Figure 10:
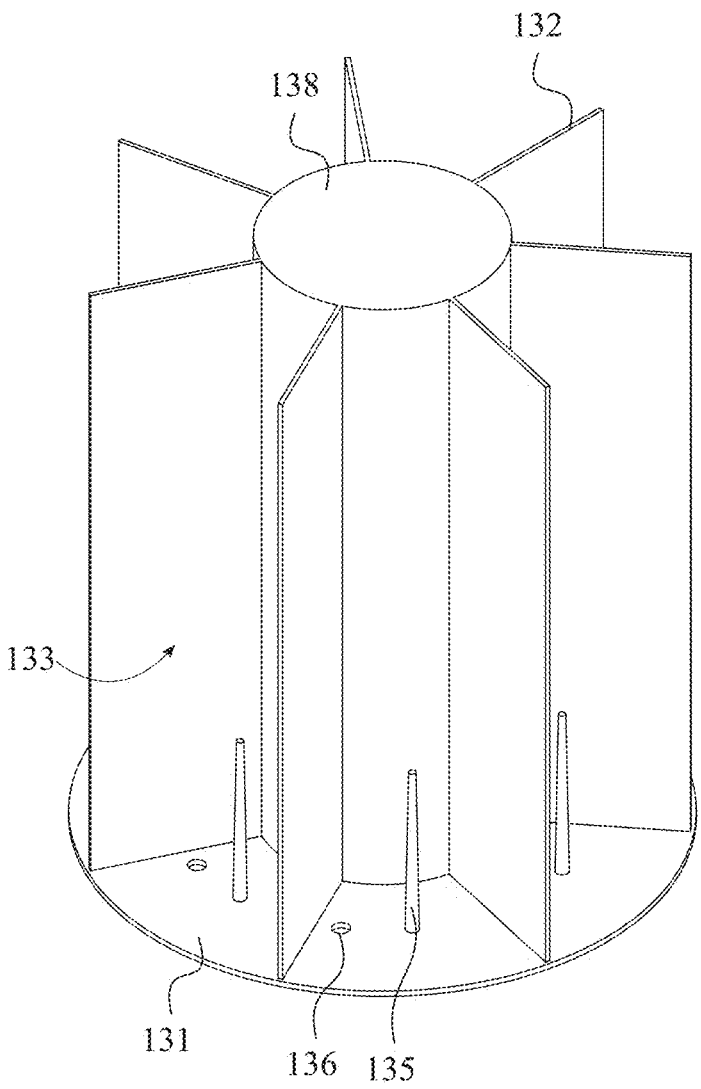
FIG. 10 depicts a perspective view of the tray of the present invention.
Figure 11:
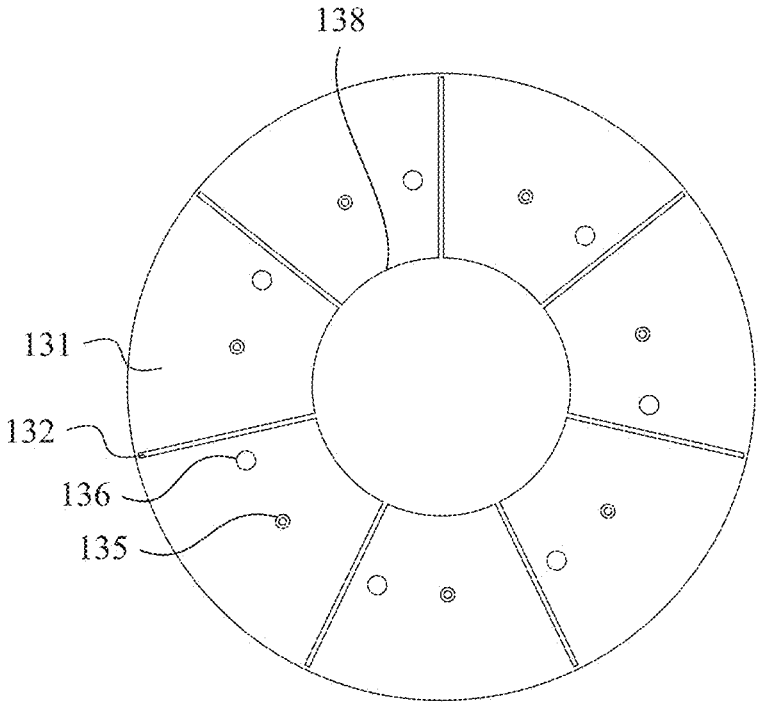
FIG. 11 depicts a top view of the tray of the present invention.
Figure 12:
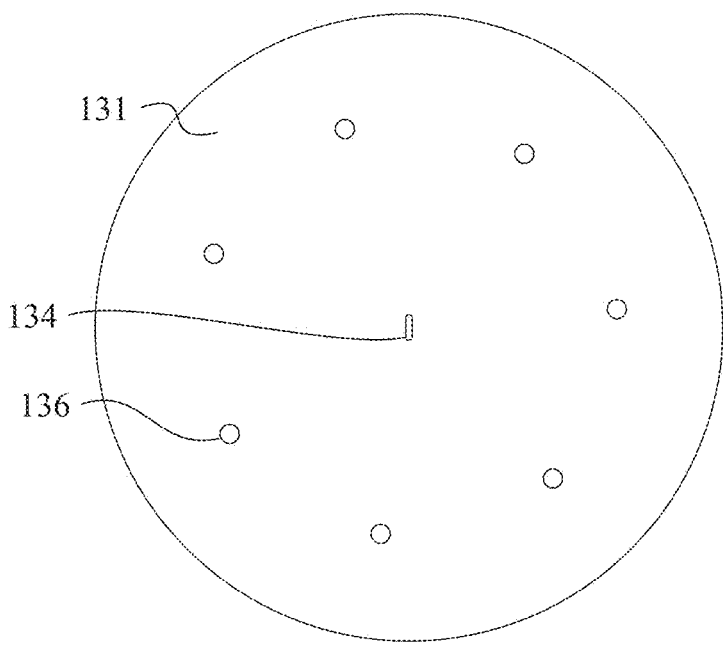
FIG. 12 depicts a bottom view of the tray of the present invention.
Figure 13:
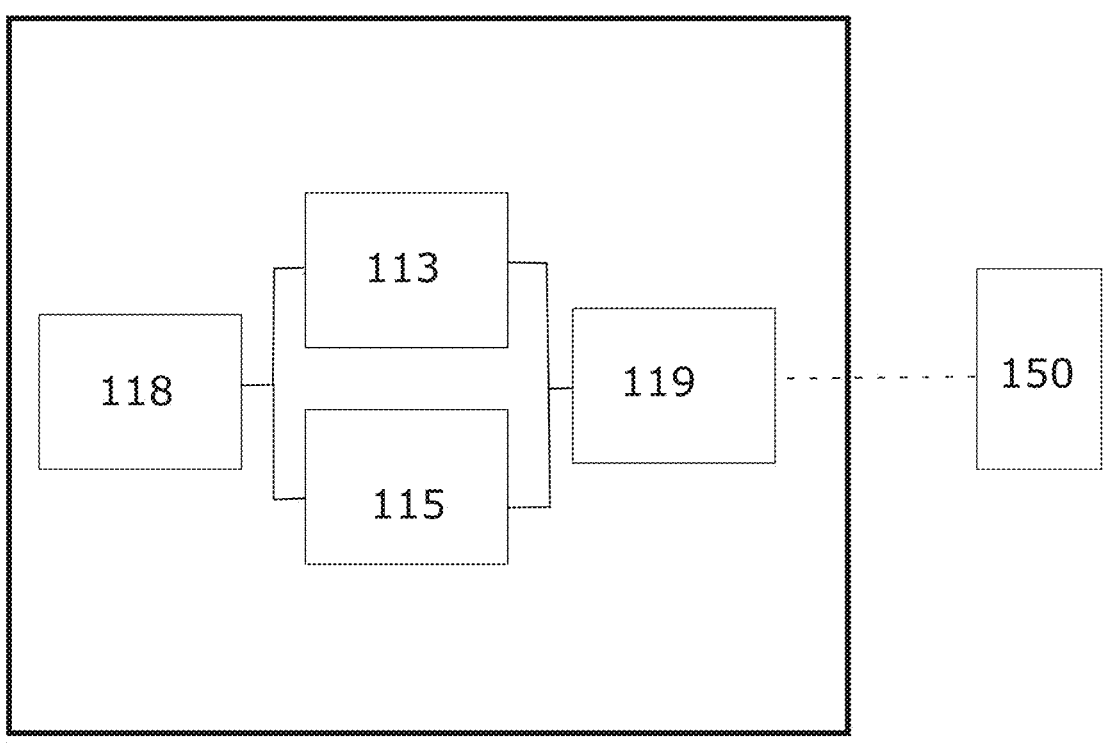
FIG. 13 depicts a block diagram illustrating the electrical components of the present invention.

In one embodiment, the base 110 further comprises a plurality of draining holes 117. Preferably, the plurality of draining holes 117 is positioned along a bottom front side of the base 110 shown in FIGS. 5 and 9, in line with the circumference. The plurality of draining holes 117 allows for drainage of fluid if any fluid unintentionally enters the tray 130 and the base 110.

In a preferred embodiment, the plurality of radial chambers 133 each comprises a locking hole 136, and the base 110 further comprises an actuator 115 configured to operate a locking pin 116 to insert into or retract from the locking hole 136. The power source 118 is configured to supply power to the actuator 115, and the controller 119 is further configured to control the actuator 115 to retract the locking pin 116 from the locking hole 136 when the rotary plate 131 is being rotated by the motor 113 and insert the locking pin 116 into the locking hole 136 when the rotary plate 131 is not being rotated by the motor 113. This mechanism will lock the rotary plate 131 in place when the motor 113 is not in operation, and thus prevent the animal (e.g., a squirrel, etc.) from damaging the present invention or acquiring extra food by pulling on the partitions. In one embodiment, the controller 119 can be programmed to operate the motor 113 and/or the actuator 115 at specific times or predetermined intervals throughout the day. In a preferred embodiment, the controller 119 is further configured to communicate with a user device 150 to receive commands to operate the motor 113. For example, the controller 119 may comprise a radio frequency (RF) receiver to receive external commands to operate the motor 113. The user device 150 may be any suitable communication and/or computing device, such as a remote, a mobile phone, a smartphone, a laptop computer, a tablet computer, and/or the like. In one embodiment, the base 110 further comprises a base housing 111 to accommodate the motor 113, the actuator 115, the controller 119, the power source 118, and other necessary electrical components.

Figure 8:
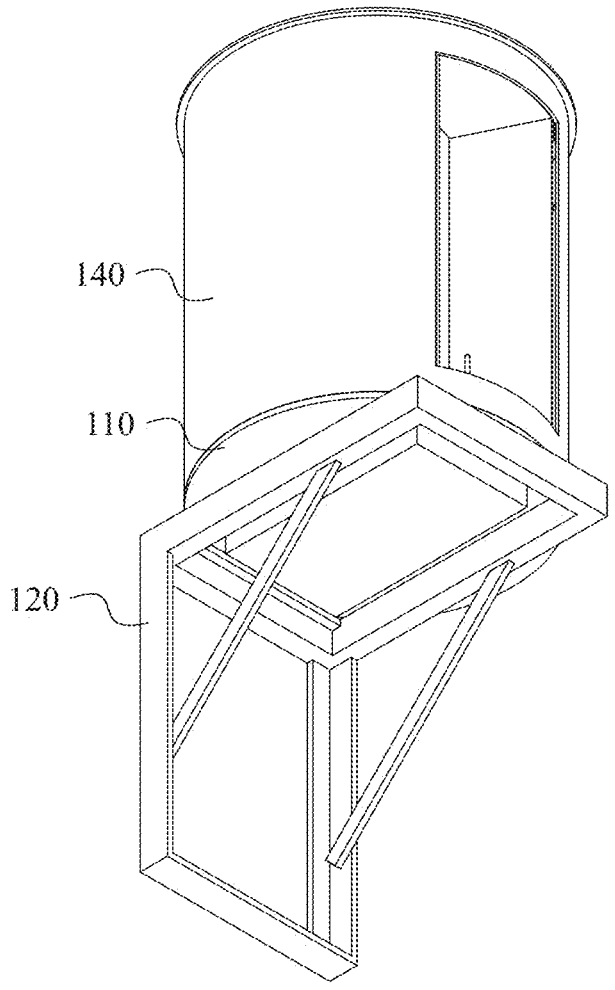
FIG. 8 depicts a perspective view of the present invention with the mounting bracket attached to the base.

In a preferred embodiment, the present invention further comprises a mounting bracket 120 attached to the base 110, as shown in FIG. 8. The mounting bracket 120 is configured to secure the present invention along a flat surface or post structure. For example, the mounting bracket 120 may comprise a plurality of legs and a plurality of mounting fasteners. The plurality of legs is positioned below the base 110, diagonally extending downward from the base. The plurality of mounting fasteners is positioned along the rear side of the mounting bracket 120 to allow the mounting bracket 120 to secure to a flat surface or a post structure. It should be further noted that the mounting bracket 120 can be created in various shapes and sizes and the plurality of mounting fasteners can be designed in various ways while still falling within the scope of the present invention.

The housing 140 is attached to the base 110 to enclose the tray 130. Preferably, the housing 140 is a hollow cylindrical component that creates a seal with the base 110. In one embodiment, the housing 140 comprises an opening 141 allowing one of the plurality of radial chambers to be accessible to the animal. Preferably, the opening 141 is a rectangular cutout that is sized to expose only one radial chamber. In another preferred embodiment, the housing 140 comprises a lid 142. The housing 140 may be removed from the base 110 to replenish the animal food items. In an alternative embodiment, the lid 142 may be removed to replenish the animal food items.

In the present invention, the tray 130 is rotated by the motor 113 to display one radial chamber to an animal at a time, the present invention allows animal lovers to control feeding times and reduce the need to place out food every day.

It is envisioned that the sizes of the components forming the present invention such as the base 110, the tray 130, and the housing 140 can vary based on design requirements. Moreover, the present invention can be made of any suitable material including but not limited to plastic, metal, composite material or the like.

Although the disclosure has been explained in relation to its preferred embodiment, it is to be understood that many other possible modifications and variations can be made without departing from the spirit and scope of the disclosure.

What is claimed is:

1. A animal feeding apparatus comprising:
   a base;
   a tray;
   a housing;
   the tray comprising a rotary plate;
   the base comprising a motor having a motor shaft operably coupled with the rotary plate to rotate the tray;
   the base further comprising a power source supplying power to the motor and a controller configured to operate the motor;
   the tray further comprising a plurality of radial chambers;
   the plurality of radial chambers being configured to hold animal food items for consumption;
   the housing being attached to the base;
   the housing comprising an opening allowing one of the plurality of radial chambers to be accessible to an animal; and
   the plurality of radial chambers each comprising a locking hole, and the base further comprising an actuator configured to operate a locking pin to insert into or retract from the locking hole.

2. The animal feeding apparatus as claimed in claim 1, wherein the rotary plate comprises a motor shaft hole that has a complementary shape to the motor shaft to receive the motor shaft.

3. The animal feeding apparatus as claimed in claim 1, wherein the plurality of radial chambers is formed by a plurality of partitions extending vertically from the rotary plate.

4. The animal feeding apparatus as claimed in claim 3, wherein the tray further comprises a central tube, and the plurality of partitions extends radially from the central tube.

5. The animal feeding apparatus as claimed in claim 1, wherein the plurality of radial chambers each comprises an animal food securing mechanism.

6. The animal feeding apparatus as claimed in claim 5, wherein the animal food securing mechanism comprises a vertical shaft with a pointed head.

7. The animal feeding apparatus as claimed in claim 1, wherein the base further comprises a plurality of draining holes.

8. The animal feeding apparatus as claimed in claim 1, wherein the power source is configured to supply power to the actuator, and the controller is further configured to control the actuator to retract the locking pin from the locking hole when the rotary plate is being rotated by the motor, and insert the locking pin into the locking hole when the rotary plate is not being rotated by the motor.

9. The animal feeding apparatus as claimed in claim 8, wherein the controller is further configured to communicate with a user device to receive commands to operate the motor.

10. The animal feeding apparatus as claimed in claim 8, wherein the base further comprises a base housing to accommodate the motor, the actuator, the controller, and the power source.

11. The animal feeding apparatus as claimed in claim 1, further comprising a mounting bracket attached to the base.

12. The animal feeding apparatus as claimed in claim 1, wherein the housing comprises a lid.

\* \* \* \* \*